United States Patent Office 3,235,477
Patented Feb. 15, 1966

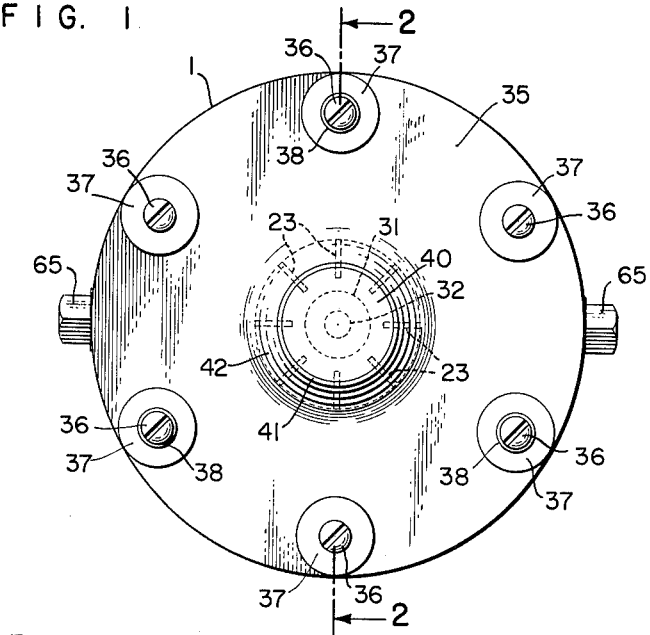
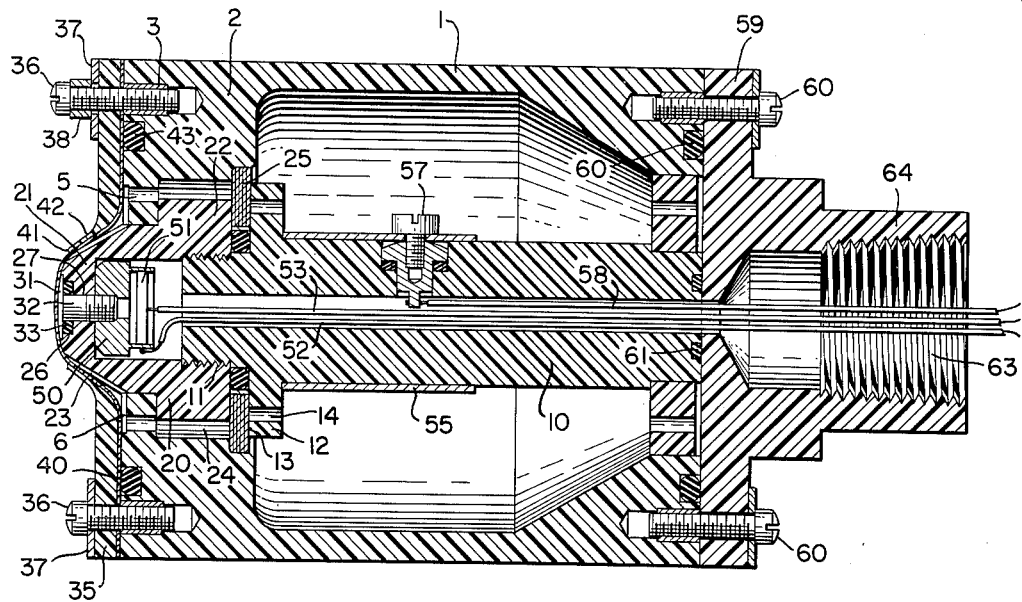

3,235,477
ELECTRICAL APPARATUS
Allen H. Keyser, Lansdale, and Ronald L. Anderson, Philadelphia, Pa., assignors to Honeywell Inc., a corporation of Delaware
Filed Oct. 12, 1962, Ser. No. 230,229
2 Claims. (Cl. 204—195)

This invention relates to polarographic cells. More specifically, the present invention relates to reducible gas detecting polarographic cells.

An object of the present invention is to provide an improved polarographic cell for detecting a dissolved reducible gas.

Another object of the present invention is to provide an improved dissolved oxygen detector using a polarographic cell technique.

A further object of the present invention is to provide an improved polarographic cell including means for preventing contamination of the cell electrolyte to assure long term operating stability.

Still another object of the present invention is to provide an improved polarigraphic cell having a rugged and simple construction for protecting the operative cell components while providing ease of repair and disassembly thereof.

In accomplishing these and other objects, there has been provided, in accordance with the present invention, a polarographic cell comprising an outer electrically insulating cylindrical hollow shell having a cover plate at both ends and arranged to store electrolyte fluid therein. The front cover plate is arranged to allow a frusto-conical end of a hollow rod to project therethrough. The rod is mounted in axial alignment with the shell and is arranged to support a first electrode at the tip of the frusto-conical end and a second electrode within the shell 1 and intermediate the ends of the rod. A selectively permeable membrane is stretched across the front end of the shell across the first electrode and is held in place by the front cover plate. A fluid passageway for the electrolyte is provided from the interior of the shell to the underside of the membrane in the vicinity of the first electrode. A fluid filter means is interposed in the fluid path to filter the electrolyte. The first electrode is attached to a thermistor element mounted in and electrically connected at one end to a thermally cooperative element positioned within the hollow rod. A separate electrical wire is attached to each of the first electrode, second electrode and the other end of the thermistor. The three wires are brought out through the hollow rod. The back cover plate for the shell is arranged to support the rod while allowing the three wires to pass therethrough and to provide a fluid seal for the electrolyte in the shell.

A better understanding of the present invention may be had from the following detailed description when read in connection with the accompanying drawings, in which:

FIG. 1 is a front view of the polarographic cell of the present invention.

FIG. 2 is a cross-sectional view of FIG. 1 taken along line 2—2.

Referring to FIG. 2, there is shown a cross-sectional view of a polarographic cell embodying the present invention and comprising an electrically insulating tubular shell 1. One end of the shell 1 is arranged with an inwardly extending peripheral shoulder 2 having a plurality of thread inserts 3 therein for accepting the threaded portion of machine screws. The inserts 3 are arranged parallel to the longitudinal axis of the shell 1 and symmetrically disposed on the shoulder 2.

The shoulder 2 is terminated in an edge 4 to form a centrally located axially symmetrical opening into the interior of the shell 1. A plurality of axially parallel holes 5 are provided in the shoulder 2 adjacent to the aforesaid opening and passing completely through the shoulder 2 to provide a fluid passage between the interior of the shell 1 and the outside surface of the shoulder 2. A portion of the outside surface of the shoulder 2 containing the holes 5 is arranged as a depressed annular surface 6 extending from the central opening in the shoulder 2 to a point just past the holes 5.

A hollow rod 10 is supported within the shell 1. The rod 10 is arranged with screw threads 11 at one end thereof and a radially extending narrow shoulder 12 on the rod adjacent to the threads 11. A depressed annular surface 13 is provided in the outer edge of the shoulder 12 facing the threads 11. A plurality of holes 14 are provided in the surface 13 passing through the shoulder 12 and parallel to the axis of the rod 10.

A hollow end cap 20 is arranged to thread onto the threads 11 of the rod 10. The end cap 20 has a forwardly projecting frusto-conical end 21 which is arranged to pass through the central opening in the shoulder 2 and project above the outside face of the shoulder 2. The end cap 20 is provided with an outwardly extending annular projection 22 to butt against the inside surface of the shoulder 2 but not extending past the holes 5. A plurality of fluid channels 23 are provided in the outside surface of the frusto-conical end 21. The channels 23, depressed surface 6, holes 5 and holes 14 are arranged to cooperate with a space 24 left between the shoulder 22 and the inside surface of the shell 1 to form a continuous fluid channel between the interior of the shell 1 and front face of the frusto-conical end 21. A fluid filter element 25 is interposed in this fluid channel and is held by an annular sealing ring between the back surface of the end cap 20 and the depressed surface 13 of the shoulder 12.

The frusto-conical end 21 is provided with a centrally-located circular recess 26 in the front face thereof surrounding an axial hole 27 passing through the end cap 20. A platinum electrode 30 having a circular head 31 and an elongated cylindrical body 32 is held in the axial hole 27 by suitable means. A rubber sealing ring 33 is held in the recess 26 between the electrode head 31 and the bottom surface of the recess 26 to seal the hole 27 from the outside surface of the frusto-conical end 21.

A front plate 35 conforming to the front surface of the shoulder 2 is held on the front surface of the shoulder 2 by a plurality of machine screws 36 and washers 37 cooperating with the inserts 3. Several of the screws 36 are arranged to have spacers 38 under the head of the screws 36 to position the face of the screw 36 substantially past the spatial position of the face of the electrode head 31. This arrangement is effective to prevent mechanical damage to the electrode head 31 in the event that the cell is placed in a vertical position upon the screws 36. A selectively permeable membrane 40 is stretched across the front face of the shoulder 2, the frusto-conical end 21 and electrode head 31 and is positioned underneath the plate 35. A centrally located opening 41 is provided in the plate 35 to allow the frusto-conical end 21 to project therethrough. The opening 41 is formed by a forwardly projecting lip 42 around the opening 41. The lip 42 is arranged to conform to a portion of the surface of the projecting end 21. When the screws 36 are tightened, the plate 35 is pressed against the shoulder 2 to retain the membrane 40, and the lips 42 are arranged to slide down the end 21 to hold the membrane 40 in intimate contact with the head 31 of the center electrode. A rubber ring 43 may be provided between the membrane 40 and the shoulder 2 to provide an additional seal between the aforementioned internal fluid path and the outside of the shell 1.

A thermally conducting cup 50; e.g., brass, is positioned inside the end cap 21 and is electrically attached to the body 32 of the first electrode. A thermistor element 51 is located within the cup 50 and is electrically connected on end thereof to the cup 50. Accordingly, the thermistor element 51 is exposed to the same temperature level as the first electrode and the electrolytic fluid in the polarographic cell. An insulated wire 52 is electrically connected to the cup 50 and is brought out through the hollow rod 10. A second insulated wire 53 is electrically connected to the other end of the thermistor 51 and is also brought out through the rod 10.

A second electrode in the form of a tightly fitting sleeve 55 is positioned on the rod 10 back of the shoulder 12. The sleeve 55 is located in a cavity 56 within the shell 1 provided for holding a quantity of electrolytic fluid for the cell. An electrical fluid-tight connection is made to the shell 55 by a screw 57 passing into the interior of the rod 10. A third insulated wire 58 is electrically attached to the screw 57 and is brought out through the rod 10.

The other end of the shell 1 is sealed by a back plate 59 which is attached to the shell 1 by a plurality of machine screws 60. A rubber sealing ring 61 is provided between the end of the rod 10 and back plate 59. The end of the shell 1 and the back plate 59 are also sealed by a rubber ring 62 located inwardly of the screws 60. Thus, the electrolytic fluid within the shell 1 is prevented from escaping into the interior of the rod 10 or the exterior of the shell 1 at the joint with the back plate 59. A wire conduit 63 is provided within the plate 59 and is aligned with the interior space of the rod 10 to allow the wires 52, 53 and 58 to be brought out through the end plate 58. The rear surface of the end plate 58 is formed into an appropriate configuration 64 to provide a mounting means for the polarographic cell. A plurality of drain plugs 65 may be provided in the shell 1 for draining and filling the electrolyte in the cell.

In operation, the sample fluid containing a dissolved reducible gas; e.g., oxygen, is brought in contact with the membrane 40 covering the electrode head 31. This may be achieved by either immersing the frusto-conical end 21 in the fluid or any desired portion of the cell of the present invention including the end 21. The molecular oxygen from the fluid permeates the selectively permeable membrane 40 which is arranged to have particular ability to pass oxygen molecules. Such a membrane could advantageously be made of Teflon. The oxygen passes into the electrolyte solution in the vincinity of the electrode head 31. In order to establish a reduction of the oxygen in the electrolyte, the electrode head 31 may be made of platinum while the sleeve electrode 55 may be made of silver. A suitable electrolyte for the aforesaid combination has been found to be a solution of potassium hydroxide. The use of potassium hydroxide is effective to stabilize the concentration of the alkaline electrolyte because of the electrochemical equivalence between the regeneration of a hydroxyl ion at the platinum electrode and concurrent utilization at the silver electrode. The reduction of the oxygen, in accordance with principles well known in the art, is effective to establish a level of conductivity between the electrode 31 and the electrode 55. Accordingly, if the cell of the present invention is included in a circuit to establish a current path through the electrolyte between the electrode elements 31, 55, the resultant current flow is proportional to the oxygen concentration in the sample solution.

The chemical reaction at the silver electrode 55 is effective to produce a precipitate of silver oxide. The migration of this precipitate, if unchecked, would tend to restrict the fluid paths through the cell and to ultimately plate the platinum electrode with a silver coating. These effects would contribute to a marked instability and deterioration of the oxygen detecting capability of the cell. The filter means 25 of the present invention is interposed in the fluid path between the silver and platinum electrode to prevent the aforesaid migration of the silver oxide precipitate toward the platinum electrode. The filter means 25 may be a plurality of layers of fluid filter paper having a porosity capable of restricting the passage of the silver oxide precipitate without impeding the electrochemical reaction of the cell. The removal of the silver oxide may be further enhanced by impregnating the filter paper 25 with an ion-exchange resin such as Dowex, a sodium or potassium form of a strong acid resin. The filter paper 25 may be advantageously located between the shoulder 12 of the rod 10 and the end cap 22. In this position, the filter paper 25 may be easily replaced by disassembling the end cap 22 from the rod 10.

The current measurement obtained from the cell as an indication of the oxygen concentration is dependent on certain fixed structural dimensions of the cell; e.g., thickness of the membrane 40, surface area of the platinum electrode, etc. In addition, it has been found that the current flow is dependent on the temperature of the sample fluid. Accordingly, the aforesaid current measurement must be coordinated with the temperature of the particular solution being tested to assure an accurate oxygen concentration measurement. The polarographic cell of the present invention includes a means for effecting an automatic temperature compensation. This means is a thermistor element 51 mounted in thermal association with the sample fluid. Specifically, the thermistor 51 is mounted in a brass cup 50 which is attached directly to the electrode body 32. Thus, the temperature of the sample solution is communicated through the membrane 40, the electrolyte and electrode head 31 to the thermal path associated with the thermistor 51. The thermistor 51 is arranged to have a temperature coefficient equal and opposite to that of an uncompensated cell. Accordingly, any temperature-induced variations in the current flow may be cancelled by introducing the thermistor 51 in an external current measuring circuit by means of the wire 53.

The structure of the cell of the present invention is particularly suitable for providing an easily disassembled unit for purposes of cleaning and/or repair. Further, the condition of the electrolyte may be checked and replenished by means of the drain plugs 65. The interior volume of the shell 1 may be varied to provide a liquid volume for the electrolyte suitable for a particular application without affecting the remaining structure of the cell. The cell structure is effective to seal the interior of the shell 1 and the electrolyte areas of the cell from the exterior of the shell 1 to allow a complete immersion of the cell in the fluid sample. The parts of the cell which do not enter into the electrochemical reaction may be constructed of an electrically insulating and chemically inert plastic material; e.g., high density polyethylene or polypropylene having a negligible porosity with respect to the reducible gas to be measured, and substantially constant physical stability.

Thus, it may be seen that there has been provided, in accordance with the present invention, a polarographic cell for measuring dissolved oxygen and characterized by temperature compensation for the measurement operation in a cell having filter means for preventing contamination of the electrolyte and a rugged structure for protecting the cell components while providing ease of repair and disassembly.

What is claimed is:

1. A polarographic cell for measuring the concentration of a dissolved reducible gas in a solution comprising a platinum electrode, a silver electrode, an electrically insulating and chemically inert means supporting said electrodes in a spaced relationship, fluid channel means for an electrolyte solution contained in said inert means and providing an electrical current bridge between said electrodes, a selectively permeable membrane supported by said inert means separating said electrodes and said electrolyte from said solution, said membrane being selectively gas permeable to said dissolved reducible gas, and a fluid filter means effective to freely pass said electrolyte solution while retaining any insoluble precipitate therein supported by said inert means in said channel between said spaced electrodes to filter all of said electrolyte passing between said electrodes, said filter means being also impregnated with an ion exchange resin.

2. A polarographic cell for measuring reducible gas content of a solution comprising a first electrode, a second electrode, electrically insulating and chemically inert means for supporting said electrodes in a spaced relationship, said means including a hollow shell, a hollow rod axially located within said shell for supporting said first electrode, an end cap having a forwardly projecting frusto-conical face attached to one end of said rod, a recess in said frusto-conical face for holding said second electrode, an end plate for one end said shell having an opening therein arranged to conform to said frusto-conical face of said end cap and to allow said frusto-conical face to project therethrough, and a fluid channel in said inert means between said pair of electrodes for an electrolyte solution bridging said pair of electrodes, a selectively permeable membrane disposed between said shell and said end-plate and covering said second electrode in said recess to separate said first electrode, said fluid channel and said second electrode from said solution, a pair of electrical conductors within said hollow rod and connected to said first and second electrodes, respectively, and a second end-plate operative to provide a fluid seal for the other end of said shell while allowing said conductors to pass therethrough, said inert means including a fluid filter means disposed in said fluid channel between said electrodes to filter all of said electrolyte passing between said electrodes, said filter means being also impregnated with an ion exchange resin.

References Cited by the Examiner

UNITED STATES PATENTS

| 2,621,671 | 12/1952 | Eckfeldt | 204—195 |
| 2,745,804 | 5/1956 | Shaffer | 204—195 |
| 2,913,386 | 11/1959 | Clark | 204—195 |
| 2,943,028 | 6/1960 | Thayer et al. | 204—195 |
| 2,954,336 | 9/1960 | Grutsch | 204—195 |
| 3,000,805 | 9/1961 | Carritt et al. | 204—195 |
| 3,028,317 | 4/1962 | Wilson et al. | 204—195 |
| 3,065,156 | 11/1962 | Thompson et al. | 204—195 |
| 3,070,539 | 12/1962 | Arthur et al. | 205—195 |
| 3,071,530 | 1/1963 | Neville | 204—195 |
| 3,098,813 | 7/1963 | Beebe et al. | 204—195 |

FOREIGN PATENTS 232,105   1/1961   Australia.

JOHN H. MACK, Primary Examiner.

MURRAY TILLMAN, WINSTON A. DOUGLAS,
Examiner.